United States Patent
Yamamoto et al.

(10) Patent No.: US 6,474,426 B2
(45) Date of Patent: Nov. 5, 2002

(54) STEERING METHOD AND STEERING SYSTEM FOR TRACKLAYING VEHICLE

(75) Inventors: Shigeru Yamamoto, Hirakata (JP); Toshikazu Okada, Osaka (JP); Hisao Asada, Hirakata (JP); Tomohiro Nakagawa, Hirakata (JP); Ikuo Kita, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/814,184

(22) Filed: Mar. 22, 2001

(65) Prior Publication Data

US 2002/0020579 A1 Feb. 21, 2002

(30) Foreign Application Priority Data

Mar. 24, 2000 (JP) .......................................... 2000-083329

(51) Int. Cl.[7] .............................................. B62D 11/06
(52) U.S. Cl. ........................... 180/9.44; 180/6.7; 475/27
(58) Field of Search ............................... 180/9, 9.1, 9.44, 180/6.44, 6.2, 6.7, 6.3, 6.66; 475/27; 477/1

(56) References Cited

U.S. PATENT DOCUMENTS

| | | | | |
|---|---|---|---|---|
| 3,650,159 A | * | 3/1972 | Cockrell et al. | 74/720.5 |
| 4,201,272 A | * | 5/1980 | Midolo | 180/6.48 |
| 4,942,934 A | * | 7/1990 | Moriarty | 180/6.48 |
| 4,949,823 A | | 8/1990 | Coutant et al. | 192/4 C |
| 5,390,751 A | * | 2/1995 | Puetz et al. | 180/6.48 |
| 6,138,782 A | * | 10/2000 | Anderson et al. | 180/6.44 |
| 6,260,641 B1 | * | 7/2001 | Hidaka | 180/6.44 |
| 6,325,166 B1 | * | 12/2001 | Shimada et al. | 180/6.48 |

FOREIGN PATENT DOCUMENTS

| | | |
|---|---|---|
| JP | 61-113078 | 7/1986 |
| JP | 63-235173 | 9/1988 |
| JP | 4-500487 | 1/1992 |

* cited by examiner

*Primary Examiner*—Avraham Lerner
(74) *Attorney, Agent, or Firm*—Armstrong, Westerman & Hattori, LLP.

(57) ABSTRACT

A steering method and steering system which enable a minimum turn radius more than the discharge capacities of a hydraulic motor and a hydraulic pump and which positively prevent the unstable traveling and turning behavior of a vehicle when the vehicle makes a pivot turn. The vehicle is provided with a pair of brakes for right and left output shafts and designed to transmit the driving force of the hydraulic motor to the output shafts through planetary gear mechanisms. During a pivot turn of the vehicle, an operation of the brake of either one of the right and left output shafts and a transmission of a driving force from the hydraulic motor to a planetary gear mechanism are simultaneously carried out for a specified period of time and thereafter, the transmission of the driving force from the hydraulic motor to the planetary gear mechanism is interrupted.

10 Claims, 15 Drawing Sheets

(a) GRAPH OF PIVOT TURN REGION (b) CHARACTERISTIC GRAPH OF PIVOT TURN CONTROL

STEERING METHOD AND STEERING SYSTEM FOR TRACKLAYING VEHICLE

TECHNICAL FIELD

The present invention relates to a steering method and steering system for a tracklaying vehicle which has a pair of brakes for the right and left output shafts thereof and in which the driving force of the hydraulic motor is transmitted to each of the output shafts through the differential steering means.

BACKGROUND ART

There is known a steering system for a tracklaying vehicle such as bulldozers, in which a hydraulic motor is driven by a hydraulic pump actuated by an engine and the output of the hydraulic motor is transmitted to right and left output shafts respectively through differential steering means such as planetary gear mechanisms so that the rotational speeds of the right and left sprockets are made different from each other thereby to allow a turn of the vehicle.

Such a steering system for a tracklaying vehicle has the drawback that since the hydraulic motor receives the reactive force of the turn resistance of the vehicle during a turn of the vehicle and since a greater reactive force acts on the hydraulic motor as the turn radius of the vehicle becomes smaller, a turn radius exceeding the capacities of the hydraulic pump and the hydraulic motor cannot be obtained. In addition, since a steering system driven by a hydraulic motor is designed to gain all of the power required for turning from hydraulic pressure, the vehicle must have sufficient engine power.

To solve the above problems, Japanese Patent Publication (KOKAI) Gazette No. 63-235173, for example, proposes a system in which right and left steering brake valves are provided in a closed circuit for the hydraulic pump and the hydraulic motor and in which a pair of brakes are provided on a transverse shaft, the system being characterized in that when the operational position of the steering lever exceeds the position corresponding to the intermediate operational amount, the output of the hydraulic motor is made to be zero while either of the right and left sprockets being braked so that a reactive force does not act on the hydraulic motor when the vehicle make a turn with a small turn radius such as a pivot turn.

The prior art technique disclosed in the above publication however reveals the following drawback. Regarding the relationship between the timing of braking the sprocket by the brake and the timing of disconnecting the hydraulic motor from the driving force, if the former (the braking timing) is slower than the latter (the disconnecting timing), the relative speed of the right and left sprockets is dependent on only the load of the road surface imposed on each crawler belt so that the turn radius of the vehicle body cannot be constant. On the other hand, if the former (the braking timing) is faster than the latter (the disconnecting timing), the vehicle body receives a great impact at the moment the vehicle starts a pivot turn.

The present invention is directed to overcoming the foregoing problems and a prime object of the invention is therefore to provide a steering method and steering system for a tracklaying vehicle, which enable a minimum turn radius no less than the discharging capacities of the hydraulic motor and the hydraulic pump and positively prevent the unstable traveling and turning behavior of the vehicle particularly when the vehicle makes a pivot turn.

DISCLOSURE OF THE INVENTION

In accomplishing the above prime object, there has been provided, in accordance with a first aspect of the invention, a steering method for a tracklaying vehicle provided with a pair of brakes for right and left output shafts and designed to allow the driving force of a hydraulic motor to be transmitted to each of the output shafts through differential steering means, Wherein, during a pivot turn of a vehicle, an operation of the brake for either one of the output shafts and a transmission of the driving force from the hydraulic motor to the differential steering means are simultaneously carried out for a specified period of time and thereafter, the transmission of the driving force from the hydraulic motor to the differential steering means is interrupted.

In the invention, during a pivot turn of the vehicle, an operation of the brake for either one of the right and left output shafts and a transmission of a driving force from the hydraulic motor to the differential steering means are simultaneously carried out for a specified period of time and then, the transmission of the driving force from the hydraulic motor to the differential steering means is interrupted so that the hydraulic motor is brought into a free condition. With this arrangement, the timing of braking operation is delayed which makes it possible to avoid an undesirable situation caused by the free condition of the hydraulic motor continuing until actuation of the brake, that is, an undesirable situation where the relative speed of the right and left sprockets is dependent upon only the load of the road surface imposed on the crawler belts. In addition, this arrangement also avoids such an unfavorable situation that a great impact is imposed on the vehicle body at the moment the vehicle starts a pivot turn. Since the driving force transmitted from the hydraulic motor to the differential steering means is shut off during a pivot turn, the reactive force of the road surface does not act on the hydraulic motor. Therefore, a pivot turn can be carried out with a conventional hydraulic motor having small capacity.

According to a second aspect of the invention, there is provided a steering system for a tracklaying vehicle provided with a pair of brakes for right and left output shafts and designed to allow the driving force of a hydraulic motor to be transmitted to each of the output shafts through differential steering means, the steering system comprising:

(a) brake operating means for independently operating the right and left brakes;

(b) driving force transmission interrupting means for interrupting a transmission of the driving force from the hydraulic motor to the differential steering means;

(c) pivot turn control command signal detecting means for detecting an issue of a vehicle pivot turn control command signal; and (d) controlling means for controlling the brake operating means and the driving force transmission interrupting means, in response to an output from the pivot turn control command signal detecting means, such that after an operation of the brake for either one of the right and left output shafts by the brake operating means and a transmission of the driving force from the hydraulic motor to the differential steering means have been simultaneously carried out for a specified period of time, the transmission of the driving force from the hydraulic motor to the differential steering means is interrupted by the driving force transmission interrupting means.

The second aspect of the invention is associated with a system for giving a concrete form to the steering method for a tracklaying vehicle of the first aspect of the invention and exerts the same effect as that of the first aspect of the invention.

Preferably, the steering system according to the second aspect of the invention further comprises engine rotational speed detecting means for detecting the rotational speed of an engine, and the controlling means controls the engine in such a way that the rotational speed of the engine detected by the engine rotational speed detecting means during a pivot turn of the vehicle is no more than a specified rotational speed value. This arrangement avoids such an unfavorable situation that while either one of the brakes being operated to stop its corresponding drive shaft, the hydraulic motor receives a driving force from the other drive shaft being rotated, resulting in an overrun of the rotation of the motor. As a result, the service life of the hydraulic motor can be increased.

The controlling means preferably executes desired control after an elapse of a specified time after receipt of an output from the pivot turn control command signal detecting means. With this arrangement, the operator's intention can be confirmed before executing the control for a pivot turn so tat safety can be ensured even if a mistake is made in operating the system.

The pivot turn control command signal detecting means preferably detects an issue of a vehicle pivot turn control command signal when a pivot turn control command switch provided in a turn operation lever has been depressed while the stroke of the turn operation lever is in a pivot turn region. With the provision of such a pivot turn control command switch, final confirmation can be made for the sake of security as to whether the operator has an intention to execute a pivot turn, even when the stroke of the pivot turn operation lever is in the pivot turn region.

Herein, the pivot turn region is in the vicinity of the lever stroke end of the turn operation lever and occupies no more than 20% of the entire lever stroke. This facilitates the adjustment of the turn operation lever within the pivot turn region.

Preferably, the pivot turn control command signal detecting means detects an issue of a vehicle pivot turn control command signal by detecting that the turn operation lever has reached the lever stroke end. With this arrangement, the power turn region of the steering control by use of the hydraulic motor can be utilized as much as possible.

According to the second aspect of the invention, it is preferable to provide a mode selection switch for selecting whether or not the control by the controlling means is to be executed. Use of the mode selection switch has the following effect: when it is determined that the operator has no intention of executing a pivot turn operation, the mode selection switch is turned ON, whereby the automatic pivot turn operation is interrupted so that control can be performed in accordance with the operator's intention.

Preferably, the driving force transmission interrupting means shuts off the transmission of the driving force from the hydraulic motor to the differential steering means by opening a communication valve disposed in a communication path which communicates the upstream and downstream of the hydraulic motor with each other within a hydraulic drive closed circuit including a hydraulic pump and a hydraulic motor. By employing such a hydraulic circuit configuration, the desired object can be accomplished with an extremely simple configuration.

The driving force transmission interrupting means may be a motor clutch for shutting off the transmission of the driving force from the hydraulic motor to the differential steering means.

BEST MODE FOR CARRYING OUT THE INVENTION

Referring now to the accompanying drawings, the steering method and steering system for a tracklaying vehicle of the invention will be described according to preferred embodiments.

First Embodiment

Figure 1:
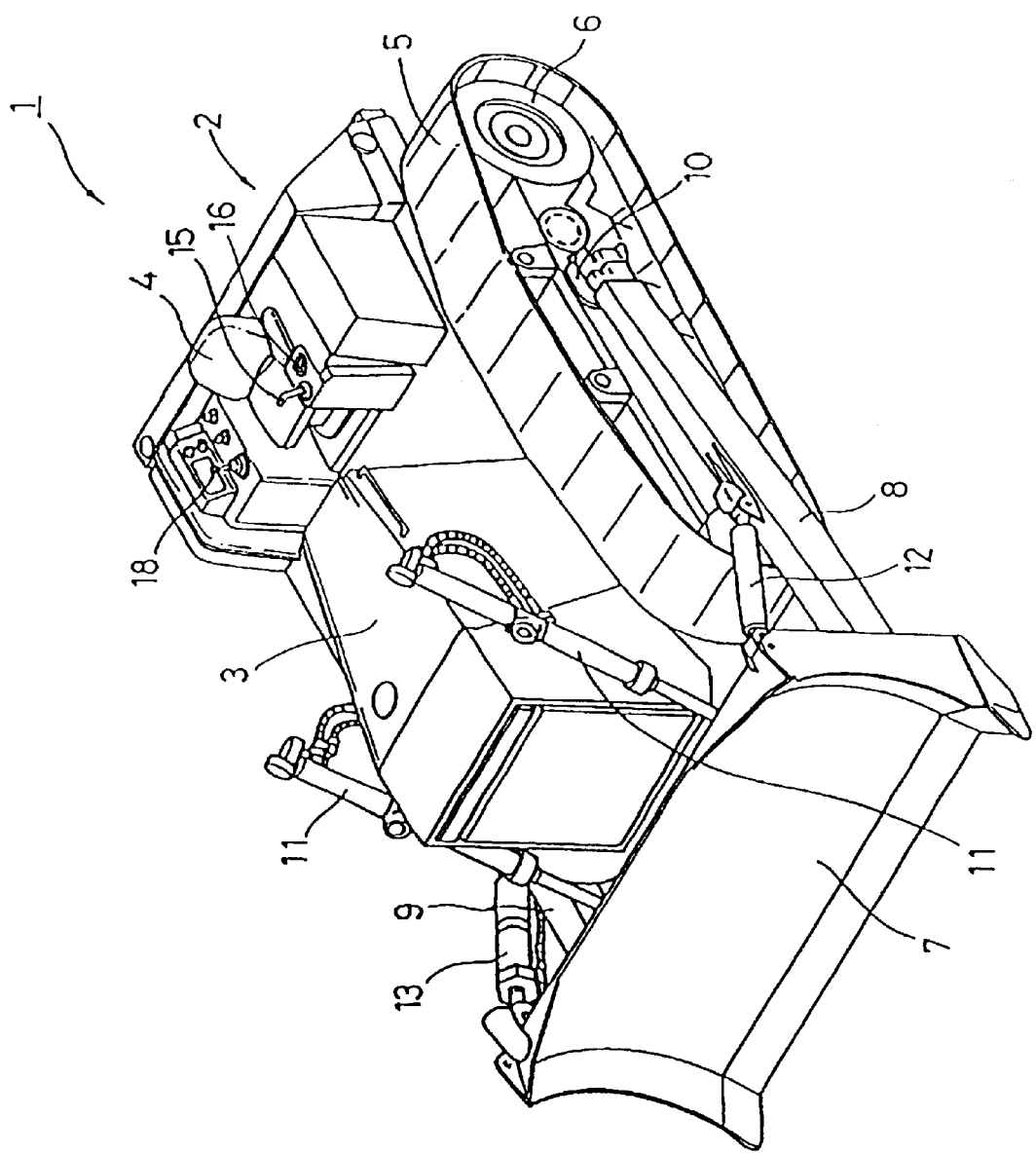
FIG. 1 shows an external appearance of a bulldozer constructed according to a first embodiment of the invention.

The first embodiment is associated with a steering system incorporated in a bulldozer. FIG. 1 shows the external appearance of a bulldozer constructed according to the first embodiment of the invention.

In the bulldozer 1 of the present embodiment, there are provided a bonnet 3 and a cab 4 on a vehicle body 2. Disposed on both right and left sides of the vehicle body 2 when viewed in the forward driving direction of the vehicle body 2 are crawler belts 5 for driving the vehicle body 2 so as to travel forwardly and reversely and turn. The crawler belts 5 are respectively independently driven by a driving force transmitted from an engine with the aid of their associated sprockets 6.

A blade 7 is supported at the leading ends of right and left straight frames 8, 9 the proximal ends of which are, in turn, pivotally supported at the right and left sides of the vehicle body 2 through trunnions 10 (the trunnion on the right side is not shown in the drawing) such that the blade 7 can be raised or lowered. A right and left pair of blade lift cylinders 11 are arranged between the blade 7 and the vehicle body 2, for raising or lowering the blade 7. A brace 12 and a blade tilt cylinder 13 are provided for laterally tilting the blade 7, with the former being positioned between the left straight frame 8 and the blade 7 and the latter being positioned between the right straight frame 9 and the blade 7.

Positioned on the left side of the cab 4 are (i) a driving lever 15 (which corresponds to the turn operation lever of the invention) for enabling forward/reverse drive selection, steering and gear change operation and (ii) a fuel controlling dial 16. On the right side of the cab 4, there is provided a blade controlling lever 18 or the like for raising, lowering, left-tilting and right-tilting the blade 7. Although not shown in the drawing, there is provided a decelerator pedal in front of the cab 4.

Figure 2:
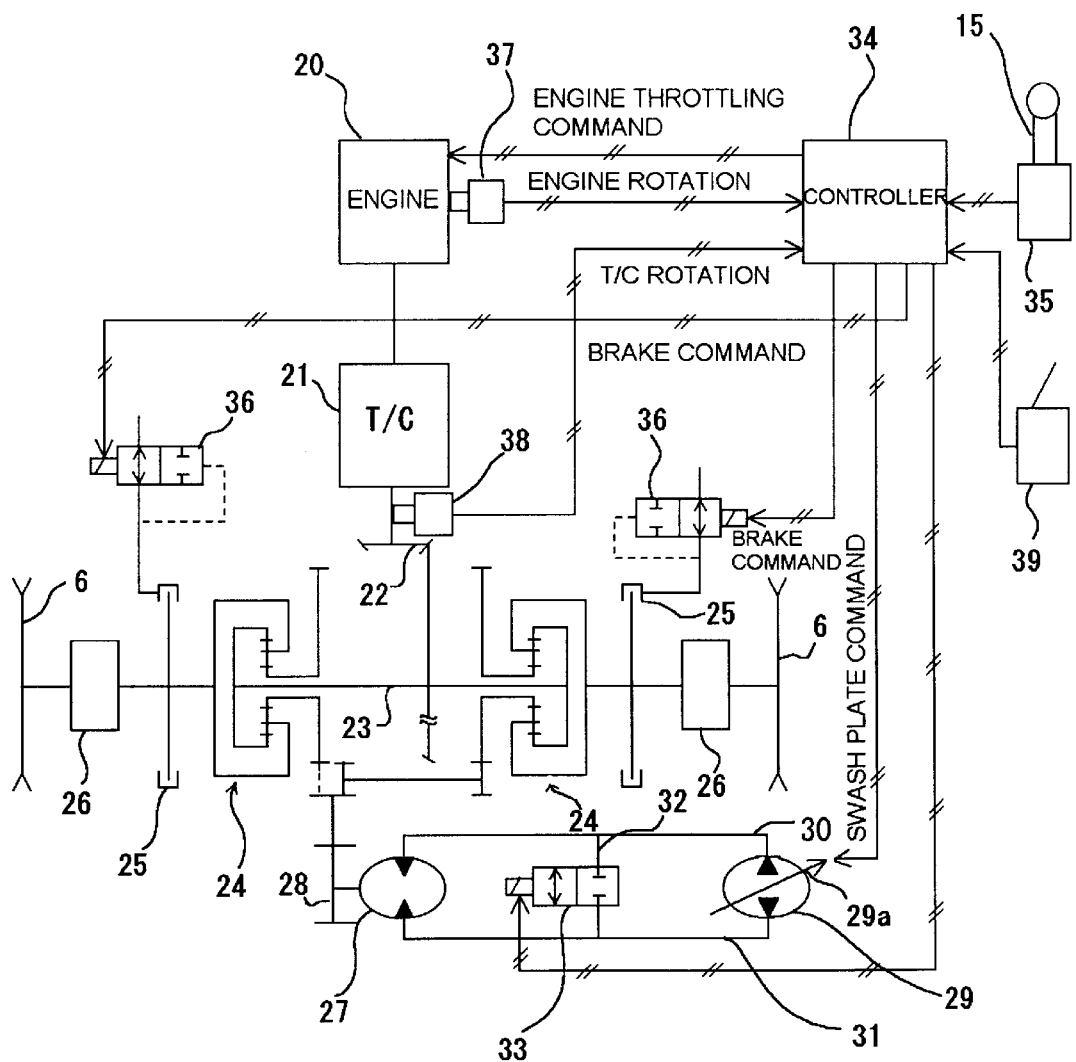
FIG. 2 is a control system configuration diagram according to the first embodiment.

Referring to FIG. 2 which shows the power transmission system and the control system configuration of the present embodiment, the rotary driving force of an engine 20 is transmitted to a torque converter 21 through a damper and a PTO (these are not shown in the drawings). Thereafter, the rotary driving force is transmitted from the output shaft of the torque converter 21 to a transmission (not shown) and then transmitted from the output shaft of the transmission to a transverse shaft 23 through a bevel pinion gear 22. Connected to the transverse shaft 23 are right and left planetary gear mechanisms 24 (which correspond to the differential steering means of the invention). The output shafts of the planetary gear mechanisms 24 are respectively coupled to the sprockets 6 through brake systems 25 and final reduction gears 26.

The planetary gear mechanisms 24 are coupled to and driven by a pinion 28 attached to the output shaft of a fixed displacement type hydraulic motor (HSS motor) 27 for steering. Connected to the output side of the torque converter 21 is a variable displacement type hydraulic pump (HSS pump) 29 from which discharged oil is introduced into the hydraulic motor 27 by way of a conduit 30 or 31. The steering system hydraulic circuit including the hydraulic pump 29 and the hydraulic motor 27 is an independent closed circuit. The hydraulic motor 27 is forwardly rotated by pressure oil discharged from one side of the hydraulic pump 29 whereas the hydraulic motor 27 is reversely rotated by pressure oil discharged from the other side of the hydraulic pump 29. The conduits 30, 31 are connected through a communication path 32 such that they can communicate with each other, and a communication valve (unload valve) 33 is interposed on halfway in the communication path 32. The communication valve 33 is controlled to shut off the communication path 32 when the solenoid is deenergized and to open the communication path 32 when the solenoid is energized upon receipt of a solenoid actuation command signal from a controller 34.

In this way, the discharged oil of the hydraulic pump 29 is supplied to the hydraulic motor 27 and the rotational speeds of the right and left sprockets 6 are made different from each other by the right and left planetary gear mechanisms 24 coupled to the output shafts of the hydraulic motor 27, whereby the travel speeds of the right and left crawler belts 5 are adjusted to turn the vehicle body 2 to the right or left. In addition, the discharged amount of oil is varied by changing the angle of a swash plate 29a of the hydraulic pump 29, whereby the rotational speed of the hydraulic motor 27 is increased or reduced to control the turn radius of the vehicle body 2. The discharging direction of the discharged oil is varied by changing the orientation of the swash plate 29a, whereby the turning direction of the vehicle body 2 is varied.

When the driving lever 15 has been manually operated, an output voltage (lever stroke voltage) corresponding to the position of the lever is output from a potentiometer 35 and the signal of it is input to the controller 34. An output signal from the controller 34 is input to a servo electromagnetic valve (not shown). According to the switching of the servo electromagnetic valve, the piston position of a servo pump (not shown) is controlled and according to the piston position, the angle of the swash plate 29a of the hydraulic pump 29 is adjusted.

When the solenoid of each brake valve (brake operating means) 36 is energized, each brake system 25 inserted between each planetary gear mechanism 24 and each final reduction gear 26 is in a non-braking state, being supplied with oil pressure. When the solenoid has been deenergized upon receipt of a brake command signal from the controller 34, each brake system 25 is brought into a braking state by a spring force.

The controller 34 issues (i) a swash plate command signal to the swash plate 29a of the hydraulic pump 29, (ii) a solenoid actuation command signal to the communication valve 33, (iii) a brake command signal to the brake valve 36 and (iv) an engine throttling command signal to the engine 20 for reducing the rotational speed of the engine 20. To enable each control operation, the controller 34 inputs (i) a lever stroke voltage signal sent from the potentiometer 35, (ii) an engine rotational speed signal sent from an engine rotational speed detector (engine rotational speed detecting means) 37 mounted on the engine 20, and (iii) a torque converter output shaft rotational speed signal sent from a torque converter output shaft rotational speed detector 38 mounted on the output shaft of the torque converter 21.

Figure 3:
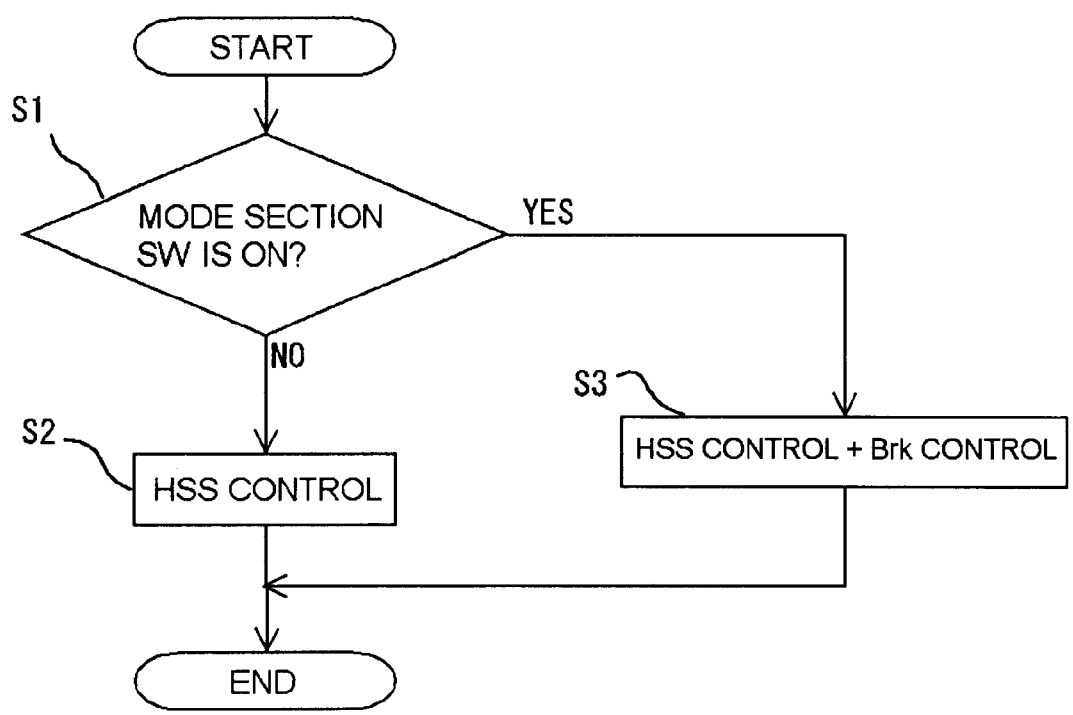
FIG. 3 is a flow chart showing a flow of mode selection control.

An ON-OFF type mode selection switch 39 is disposed at a specified position in the neighborhood of the cab 4, which is depressed by the operator for selecting whether or not vehicle pivot turn control (described later) is to be performed. As shown in the flow chart of FIG. 3, the controller 34 determines whether or not the mode selection switch 39 has been turned ON (Step Si), and if the mode selection switch 39 has been turned OFF, the so-called power turn, which is made by the ordinary steering control (hereinafter referred to as "HSS control") with the hydraulic motor 27, is executed (Step S2) even when the lever stroke of the driving lever 15 is in a preset pivot turn region (which is the stroke end in this embodiment). On the other hand, if the mode selection switch 39 has been turned ON, the pivot turn control (HSS control+brake control) of the present embodiment (described later) is executed when the lever stroke of the driving lever 15 comes into the preset pivot turn region (Step S3).

Figure 4:
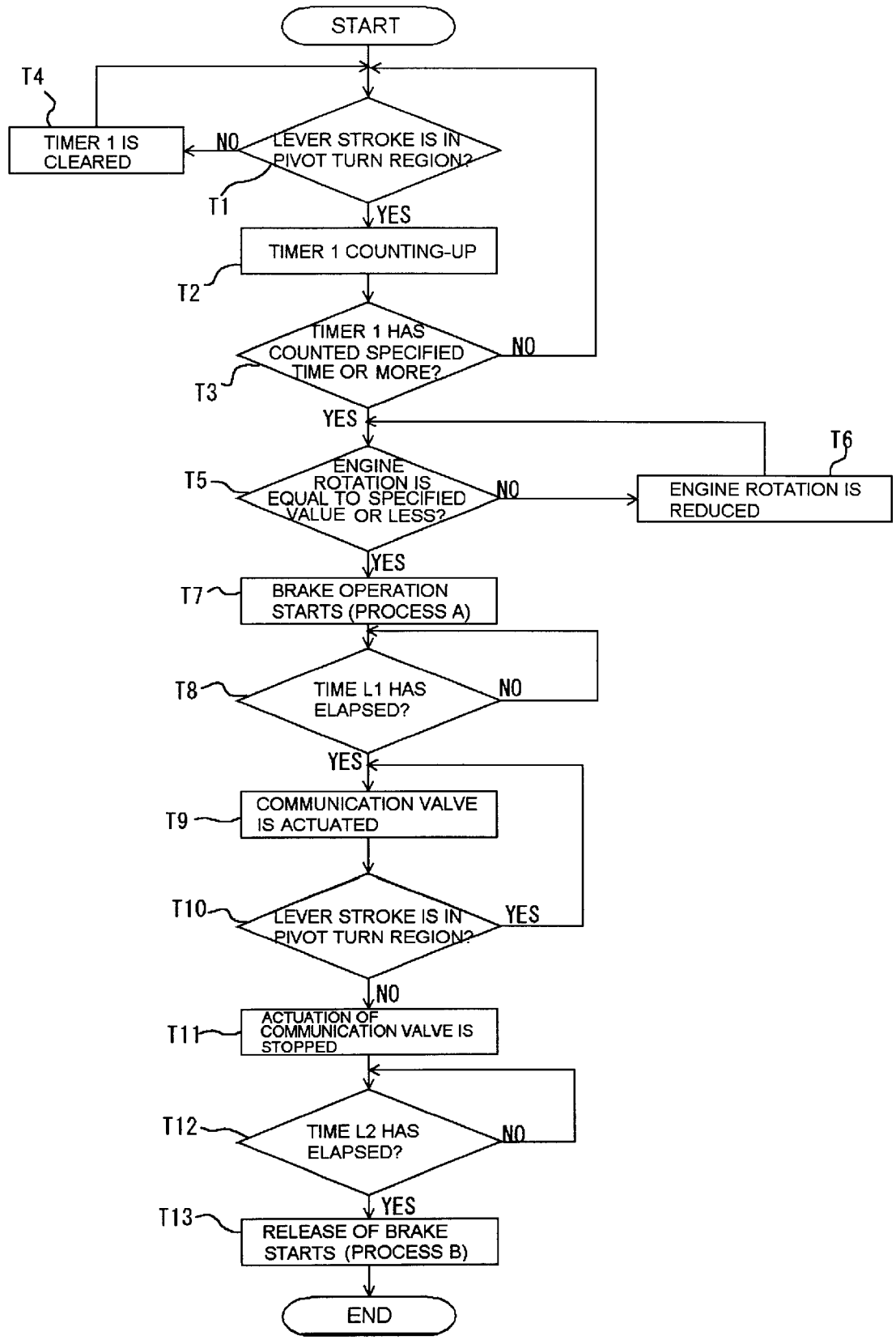
FIG. 4 is a flow chart showing a flow of pivot turn control according to the first embodiment.

Next, the pivot turn control (brake control) of the present embodiment will be described with reference to the flow chart of FIG. 4.

T1: It is determined whether the lever stroke of the driving lever 15 is in the pivot turn region. As shown in FIG. 5(a), the pivot turn region (pivot turn point) of this embodiment corresponds to when the lever stroke is 100%, in other words, when the driving lever 15 has been pushed down to the stroke end.

T2 to T3: When the lever stroke is in the pivot turn region, count-up is started with a timer 1 for counting the time during which the driving lever 15 is held in the pivot turn region and then a check is made to determine whether the time counted by the timer 1 is equal to or more than a specified time (about 1 to 3 seconds in the present embodiment). It should be noted that such a timer 1 is employed for the purpose of appropriately starting the following pivot turn control after regarding the behavior of the operator in which the driving lever 15 is pushed down to and held at the stroke end as the operator's intention of further reducing the turn radius of the vehicle.

T4: If the lever stroke is not in the pivot turn region, the timer 1 is then cleared to execute the determination of Step Ti again.

T5 to T6: A check is made to determine whether the rotational speed of the engine 20 detected by the engine rotational speed detector 37 exceeds a specified rotational speed value which has been preset. If it is more than the specified rotational speed value, an engine throttling command is issued to the engine 20 to reduce its rotational speed. Note that this control is performed in order that the rotational speed of the hydraulic motor 27 does not exceed an allowable motor rotational speed during execution of the pivot turn control.

T7: If the rotational speed of the engine 20 is equal to or less than the specified rotational speed value, a brake command signal is issued to one of the brake valves 36 thereby to start the operation of the brake system 25. The braking pattern of the brake system 25 at that time is designed as indicated by Process A of FIG. 5(*b*), according to which the pressure oil is withdrawn when the brake is in the brake released state (Point $a_1$) to lower the pressure of the brake from Point $a_1$ to Point $a_2$. Then, braking force is gradually increased from Point $a_2$ to Point $a_3$, and at the time $T_1$, the brake is engaged at Point $a_3$. After the engagement, the pressure of the brake is made to be zero.

T8 to T10: After completion of the operation of the brake system 25, a check is made to determine whether a specified time L1 has been elapsed and if so, an actuation command signal is issued to the solenoid for the communication valve 33 to open the communication path 32. This causes the output of the hydraulic motor 27 to be zero, so that the hydraulic motor 27 comes into a free condition, upon elapse of the specified time L1 after the right or left brake system 25 has been braked. In other words, the hydraulic motor 27 becomes free, after the operation of the brake system 25 and the transmission of the driving force from the hydraulic motor 27 to the sprocket 6 have been simultaneously carried out for a specified period of time. Therefore, this arrangement prevents such an unfavorable situation that the relative speed of the right and left sprockets is dependent upon only the load of the road surface imposed on each crawler belt, due to the delay of the operation timing of the brake system 25 and the continuation of the free condition of the hydraulic motor 27 until the operation of the brake system 25. In addition, thanks to the above arrangement, no great impact is imposed on the vehicle body at the moment a pivot turn is started and accordingly, a pivot turn can be smoothly carried out without a turning reactive force exerted on the hydraulic motor 27 by the road surface. It is preferable to experimentally set the specified time L1 to about 0.2 to 0.5 second, because the shock caused when a pivot turn starts can be minimized by this range. The actuation of the communication valve 33 continues until the lever stroke gets out of the pivot turn region.

T11: When the lever stroke has got out of the pivot turn region, the actuation of the communication valve 33 is stopped, so that the hydraulic motor 27 is released from the free condition.

T12 to T13: A check is made to determine whether a specified time L2 has elapsed after the actuation of the communication valve 33 has been stopped. If the specified time L2 has elapsed, the release of the brake system 25 is started. The releasing pattern of the brake system 25 at that time is set as follows. As indicated by Process B of the FIG. 5(*b*), the pressure oil is supplied at the time $T_2$ so that the brake pressure rises from zero to Point $b_1$, and then, the braking force is gradually reduced from Point $b_1$ to Point $b_2$. At Point $b_2$, the brake is released and thereafter the brake pressure is increased to Point $b_3$. It is preferable that the specified time L2 be set experimentally to about 0.2 to 0.5 second like the specified time L1, because the shock at the instant the vehicle gets out of the pivot turning condition can be minimized.

Second Embodiment

Figure 6:
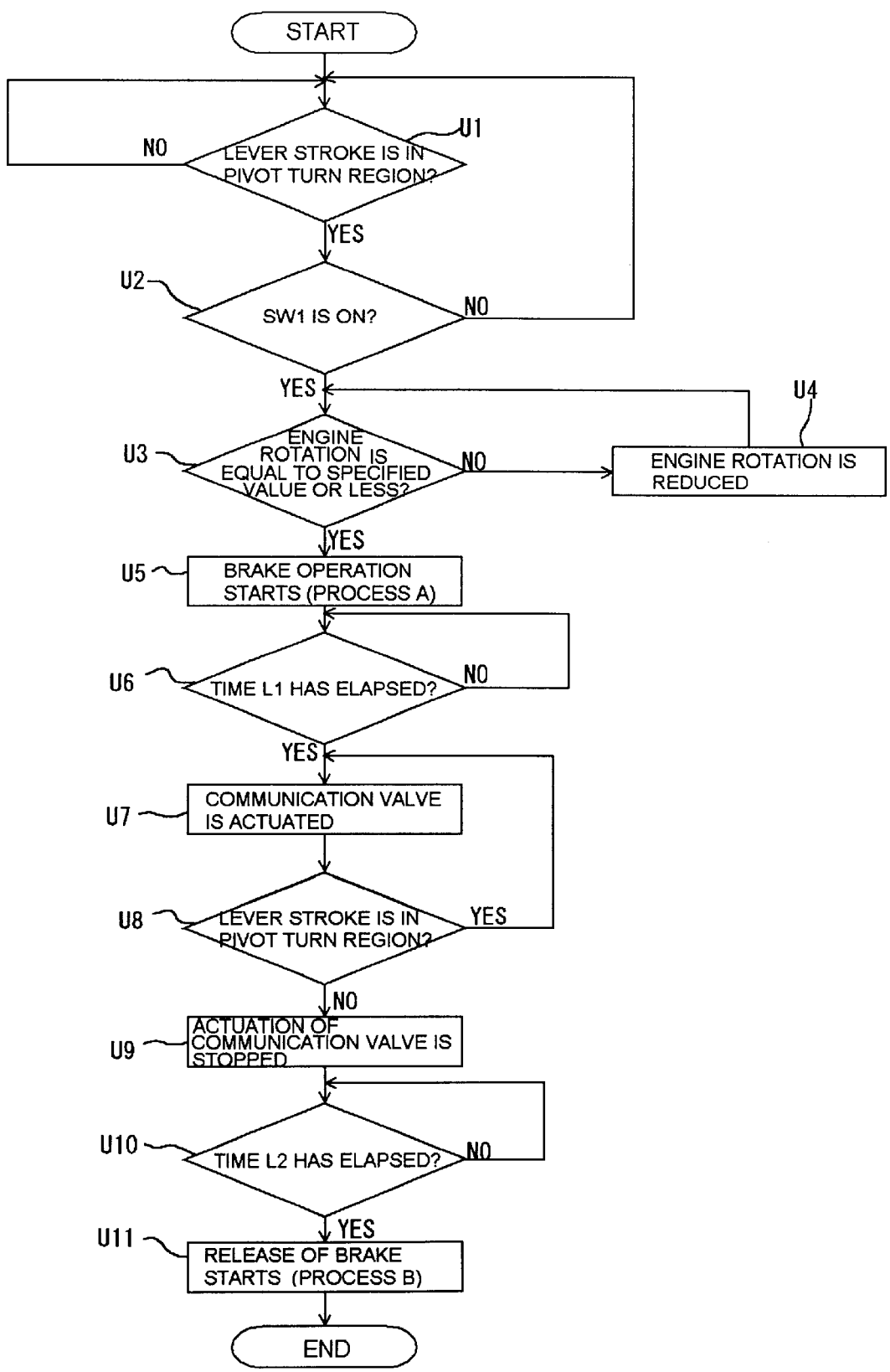
FIG. 6 is a flow chart showing a flow of pivot turn control according to a second embodiment of the invention.

FIG. 6 shows a flow chart of pivot turn control according to a second embodiment of the invention. The second embodiment does not basically differ from the first embodiment in terms of the hard structure of the bulldozer, its control system configuration and others. Therefore, an explanation of the parts and functions common to the first and second embodiment will be omitted, while only the features inherent to the second embodiment will be hereinafter described.

In the present embodiment, a pivot turn control command switch SW1 is provided at a desired position (e.g., the leading end) of the driving lever 15. Only when the lever stroke is in the pivot turn region and the pivot turn control command switch SW1 has been turned ON, pivot turn control is executed.

Next, reference is made to the flow chart of FIG. 6 to describe the pivot turn control (brake control) of the second embodiment.

Figure 5:
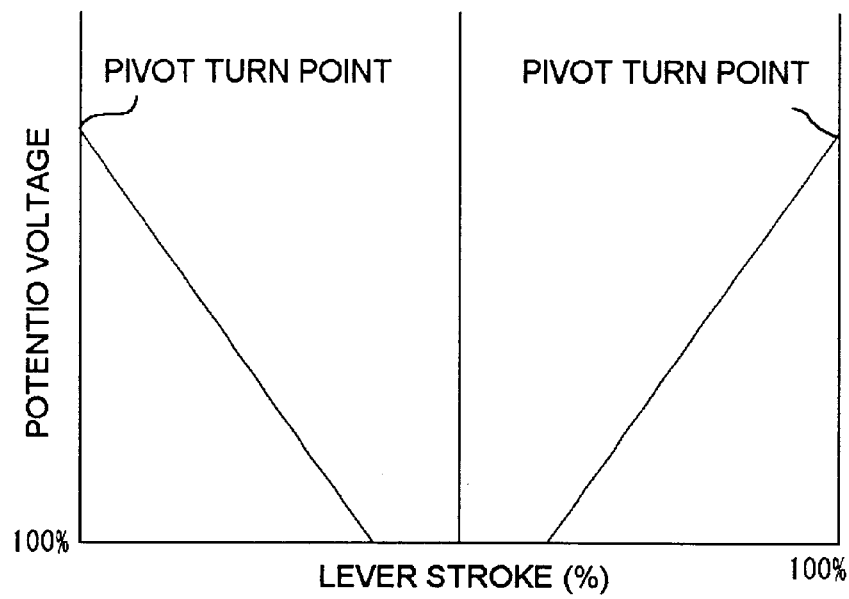
FIG. 5(a) is a graph showing a pivot turn region.
FIG. 5(b) is a characteristic graph of the pivot turn control.
Figure 5:
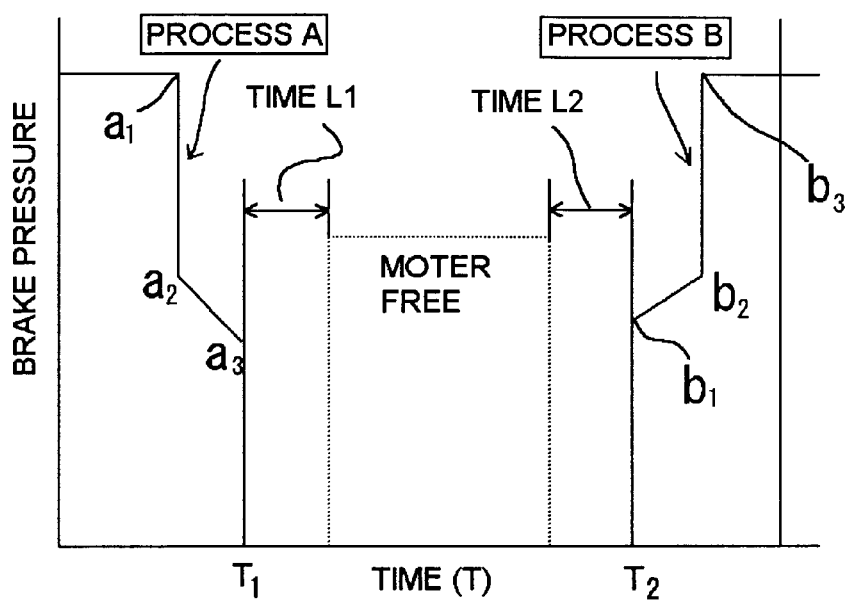

U1: A check is made to determine whether or not the stroke of the driving lever 15 is in the pivot turn region. Similarly to the first embodiment, the pivot turn region (pivot turn point) of the second embodiment corresponds to when the lever stroke is 100%, in other words, when the driving lever 15 has been pushed down to the stroke end, as shown in FIG. 5(*a*).

U2: When the lever stroke is in the pivot turn region, a check is then made to determine whether the pivot turn control command switch SW1 has been turned ON. If the pivot turn control command switch SW1 has not been turned ON, the flow returns to Step U1 and if the switch SW1 has been turned ON, the flow proceeds to Step U3.

U3 to U11: These steps are the same as Steps T5 to T13 of the first embodiment and therefore a detailed description thereof is omitted herein.

In the second embodiment, when the operator has pushed the driving lever 15 down to the stroke end and turned the pivot turn control command switch SW1 ON with the driving lever 15 positioned at the stroke end, it is determined that the operator has an intention to reduce the turn radius of the vehicle, so that pivot turn control is started. With this arrangement, the final confirmation as to whether the operator has an intention to carry out pivot turn control can be made without fail and a control execution command can be issued manually, which has the effect of ensuring more security.

Third Embodiment

Figure 7:
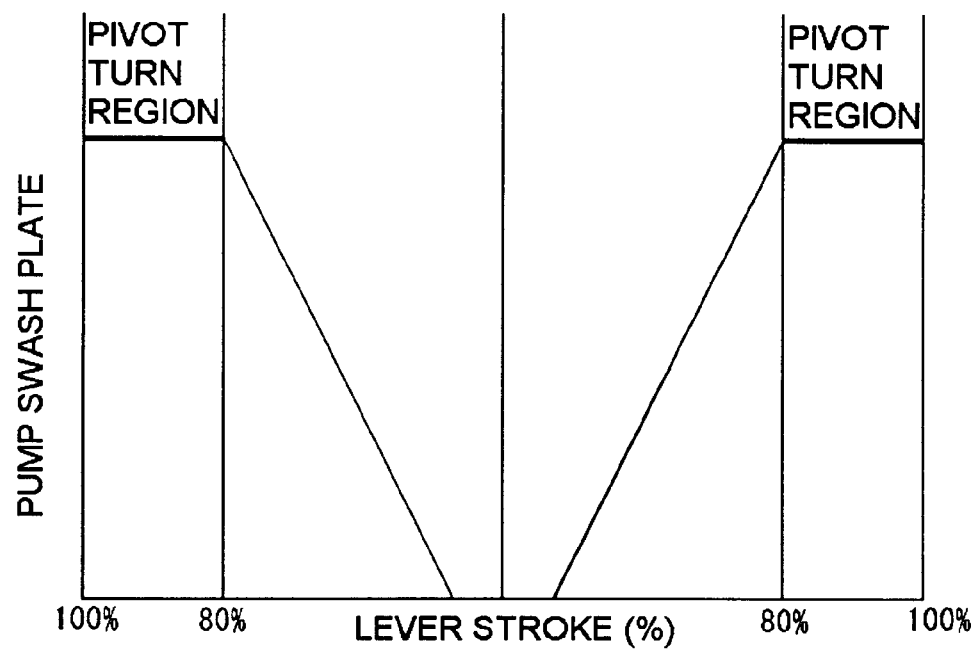
FIG. 7 is a graph showing a pivot turn region according to a third embodiment of the invention.

FIG. 7 shows a graph showing a pivot turn region (the relationship between a lever stroke and a pump swash plate) according to a third embodiment of the invention.

While the pivot turn region is defined as the moment when the driving lever 15 has been pushed down to its stroke end in the foregoing embodiments, the pivot turn region of the third embodiment is defined as the moment when the stroke of the driving lever 15 has reached 80% or more of its full stroke as shown in FIG. 7. The flow of the pivot turn control of this embodiment is similar to that of the second embodiment shown in FIG. 6, and therefore its detailed description is omitted herein.

Fourth Embodiment

Figure 8:
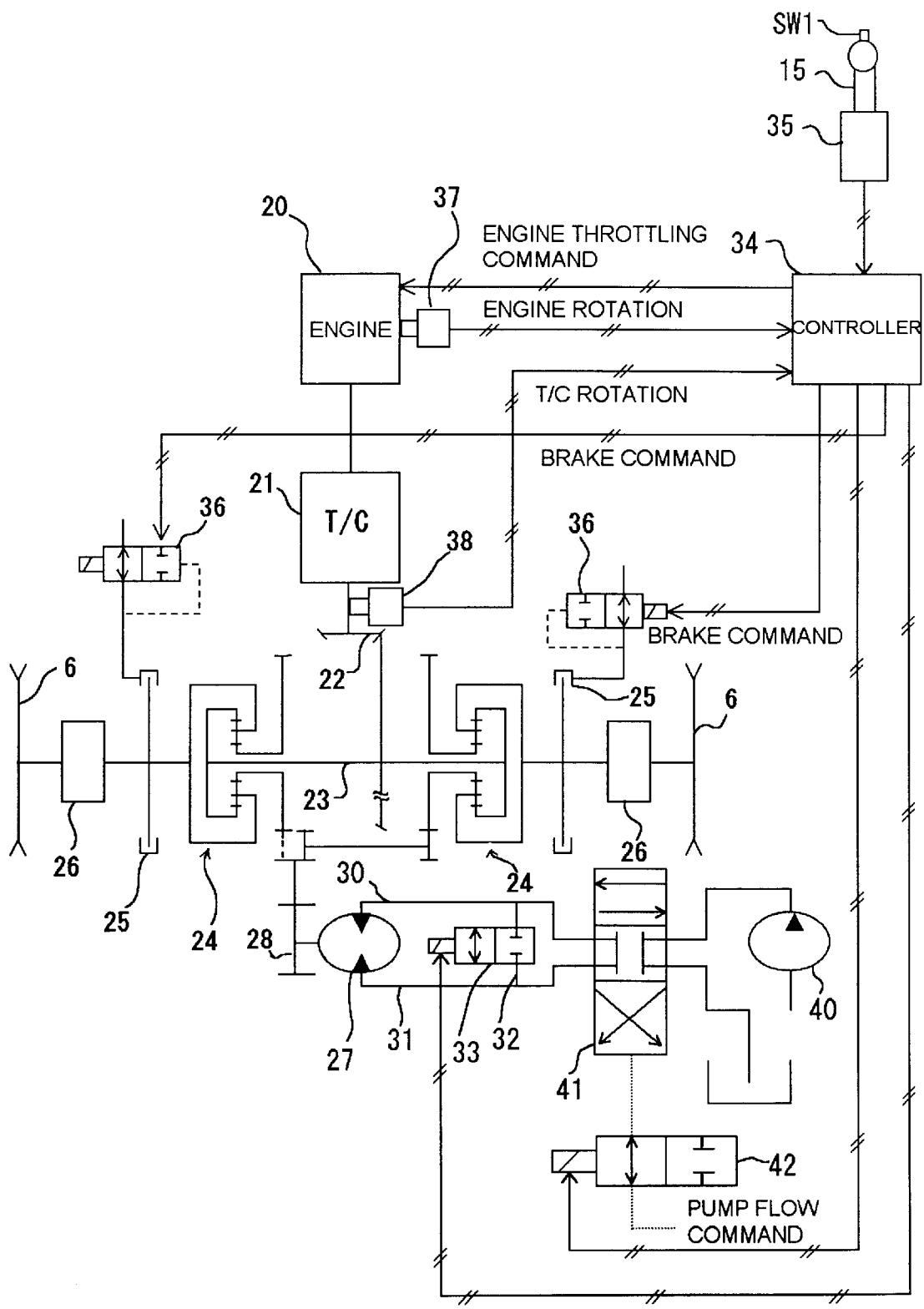
FIG. 8 is a control system configuration diagram according to a fourth embodiment of the invention.

FIG. 8 shows a control system configuration diagram of a fourth embodiment of the invention.

It should be noted that the following embodiments have different circuit configurations for a steering system hydraulic circuit including a hydraulic pump and a hydraulic motor and different driving force transmission interrupting means for shutting off a transmission of a driving force from the hydraulic motor to the planetary gear mechanism 24. In each of these embodiment, there is provided the pivot turn control command switch SW1 at the leading end of the driving lever 15.

The fourth embodiment employs a fixed displacement type pump as a hydraulic pump 40. This hydraulic pump 40 and the hydraulic motor 27 constitute an open circuit. The communication valve 33 similar to that of the first embodiment is inserted in the communication path 32 between the conduits 30, 31 for introducing discharged oil from the hydraulic pump 40 to the hydraulic motor 27. There are provided a direction control valve 41 between the hydraulic pump 40 and the hydraulic motor 27, and an electromagnetic control valve 42 for controlling the actuation of the direction control valve 41 in response to a pump flow command from the controller 34. The same effect as that of the foregoing embodiments can be achieved by the above arrangement.

Fifth Embodiment

Figure 9:
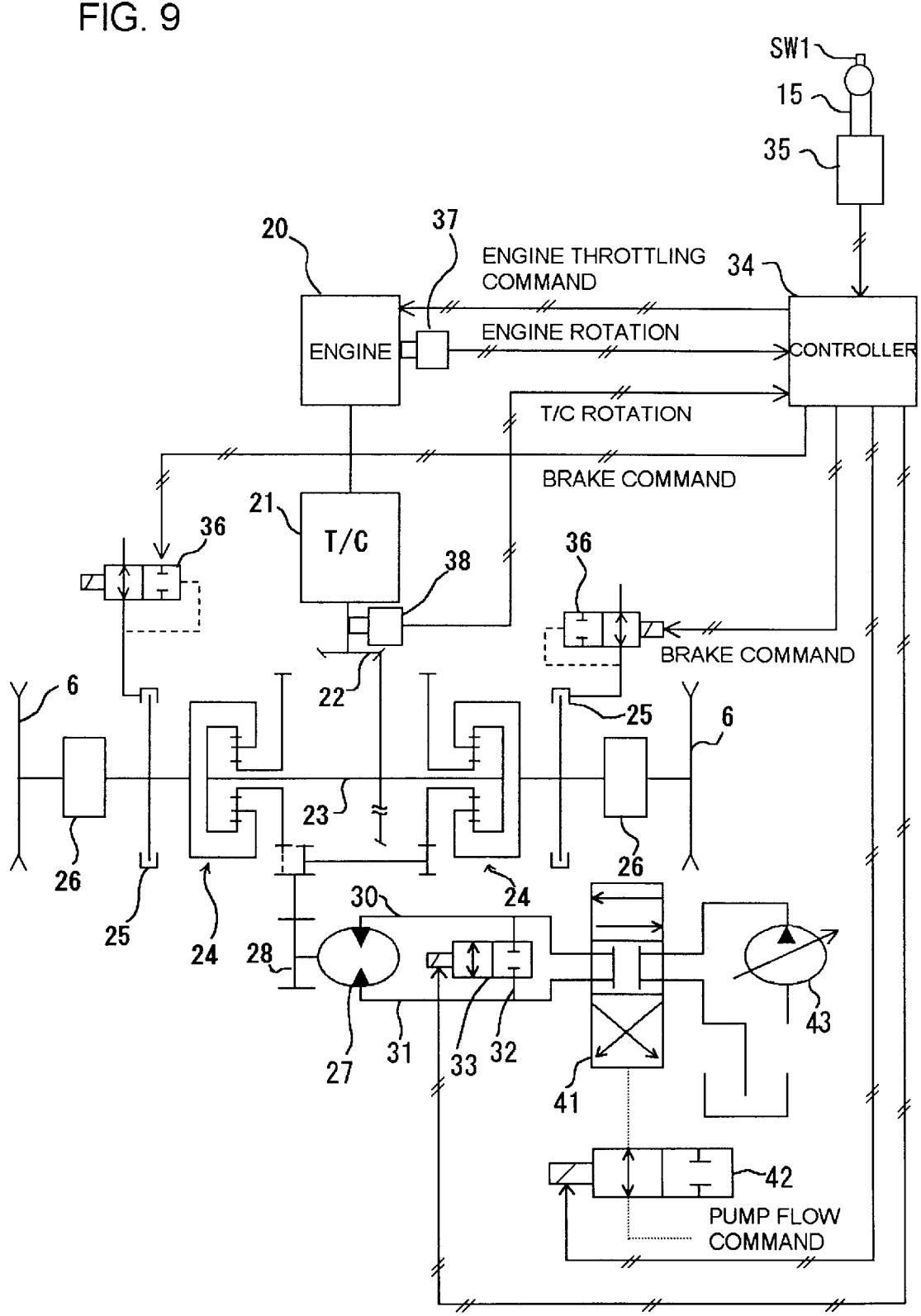
FIG. 9 is a control system configuration diagram according to a fifth embodiment of the invention.

FIG. 9 shows a control system configuration diagram of a fifth embodiment of the invention.

In this embodiment, a variable displacement type hydraulic pump 43 is used in place of the fixed displacement type hydraulic pump 40 of the fourth embodiment. Other components than the pump are similar to those of the fourth embodiment.

Sixth Embodiment

Figure 10:
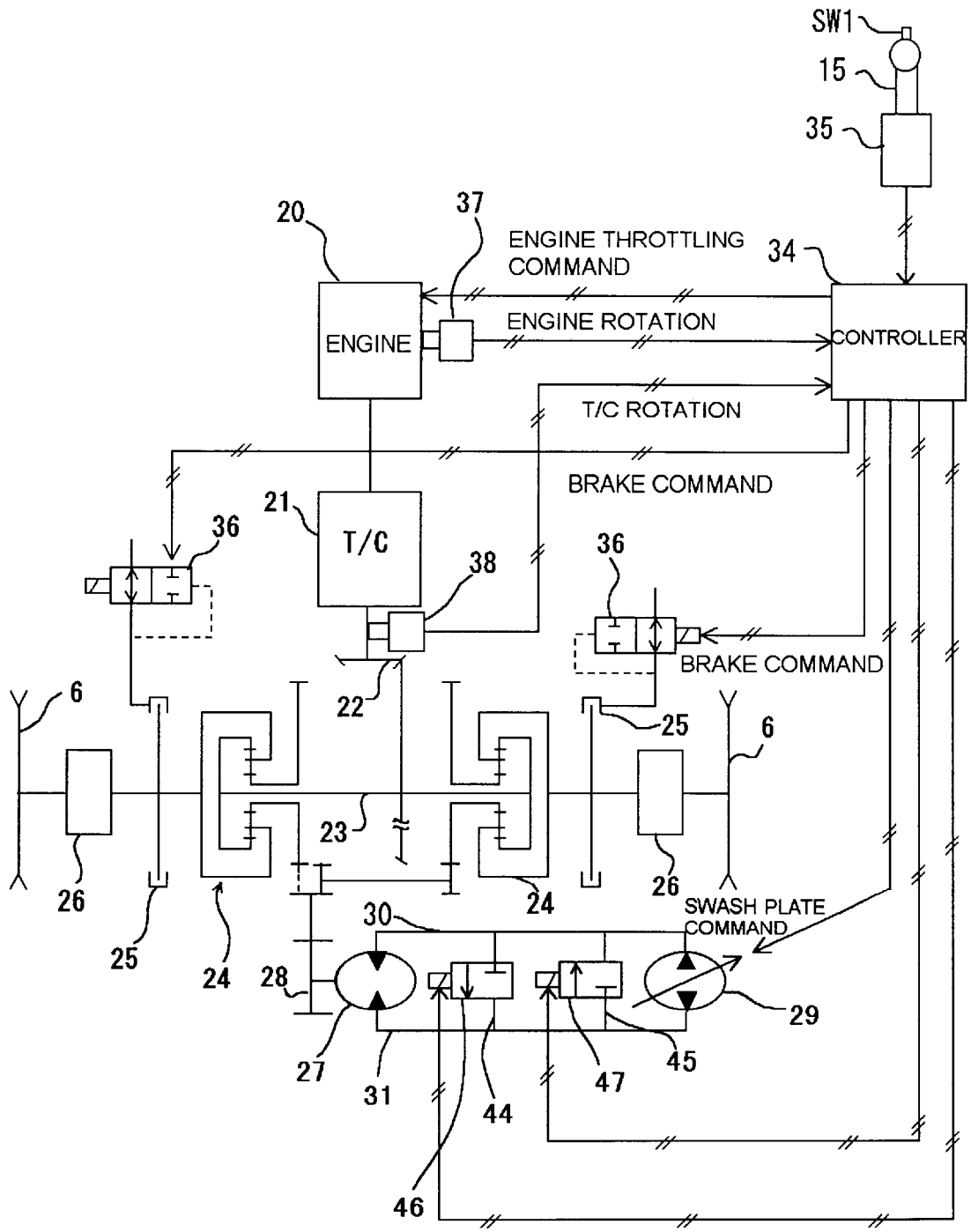
FIG. 10 is a control system configuration diagram according to a sixth embodiment of the invention.

FIG. 10 shows a control system diagram of a sixth embodiment of the invention.

According to the sixth embodiment, an independent closed hydraulic circuit, which comprises the same hydraulic pump 29 and hydraulic motor 27 as those of the first embodiment shown in FIG. 2, is provided with two communication paths 44, 45 between the conduits 30, 31 and these communication paths 44, 45 are provided with relief valves 46, 47, respectively. The relief pressure of the release valves 46, 47 becomes equal to a preset value when the solenoids of the release valves 46, 47 are energized, and becomes zero when they are deenergized. Therefore, when the relief pressure becomes zero, the output of the hydraulic motor 27 becomes zero and the hydraulic motor 27 is brought into a free condition.

Seventh Embodiment

Figure 11:
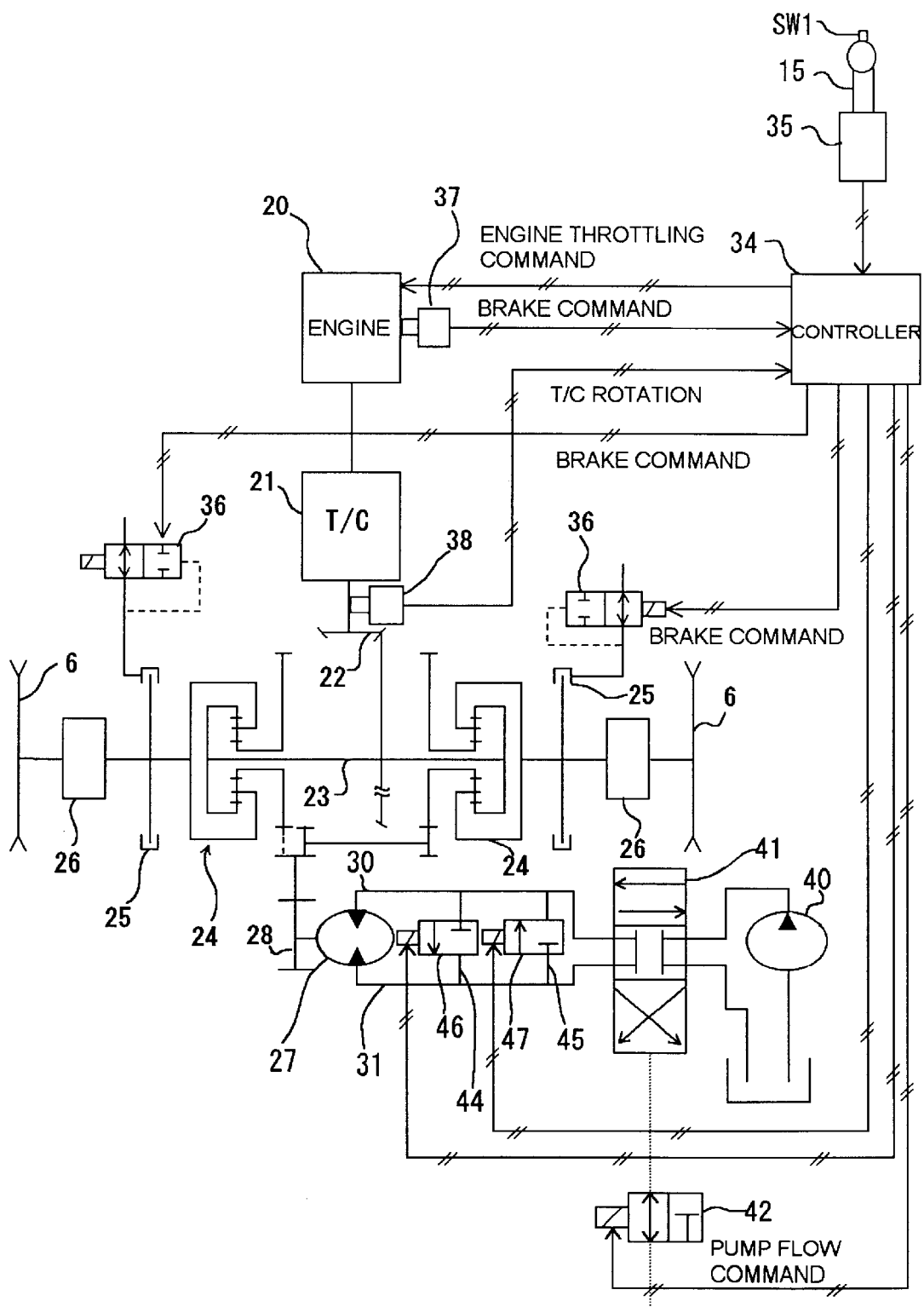
FIG. 11 is a control system configuration diagram according to a seventh embodiment of the invention.

FIG. 11 is a control system diagram of a seventh embodiment of the invention.

In an open hydraulic circuit comprising the same fixed displacement type hydraulic pump 40 and hydraulic motor 27 as those of the fourth embodiment shown in FIG. 8, there are provided the two communication paths 44, 45 between the conduits 30, 31 and these communication paths 44, 45 comprise the relief valves 46, 47, respectively.

Eighth Embodiment

Figure 12:
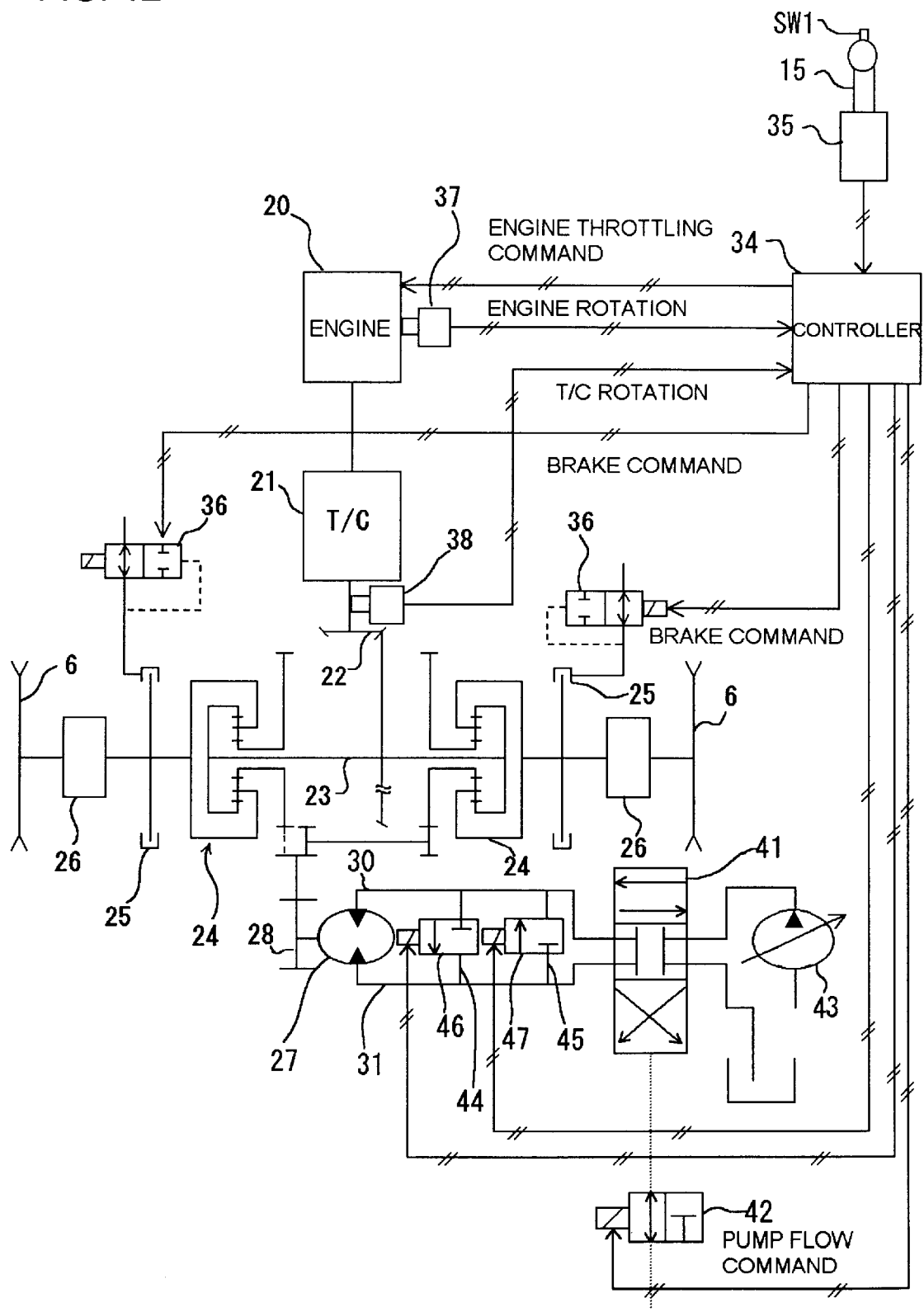
FIG. 12 is a control system configuration diagram according to an eighth embodiment of the invention.

FIG. 12 shows a control system diagram of an eighth embodiment of the Invention.

According to the eighth embodiment, an open hydraulic circuit, which comprises the same variable displacement type hydraulic pump 29 and hydraulic motor 27 as those of the fifth embodiment shown in FIG. 9, is provided with the two communication paths 44, 45 between the conduits 30, 31 and these communication paths 44, 45 are provided with the relief valves 46, 47, respectively.

Nine Embodiment

Figure 13:
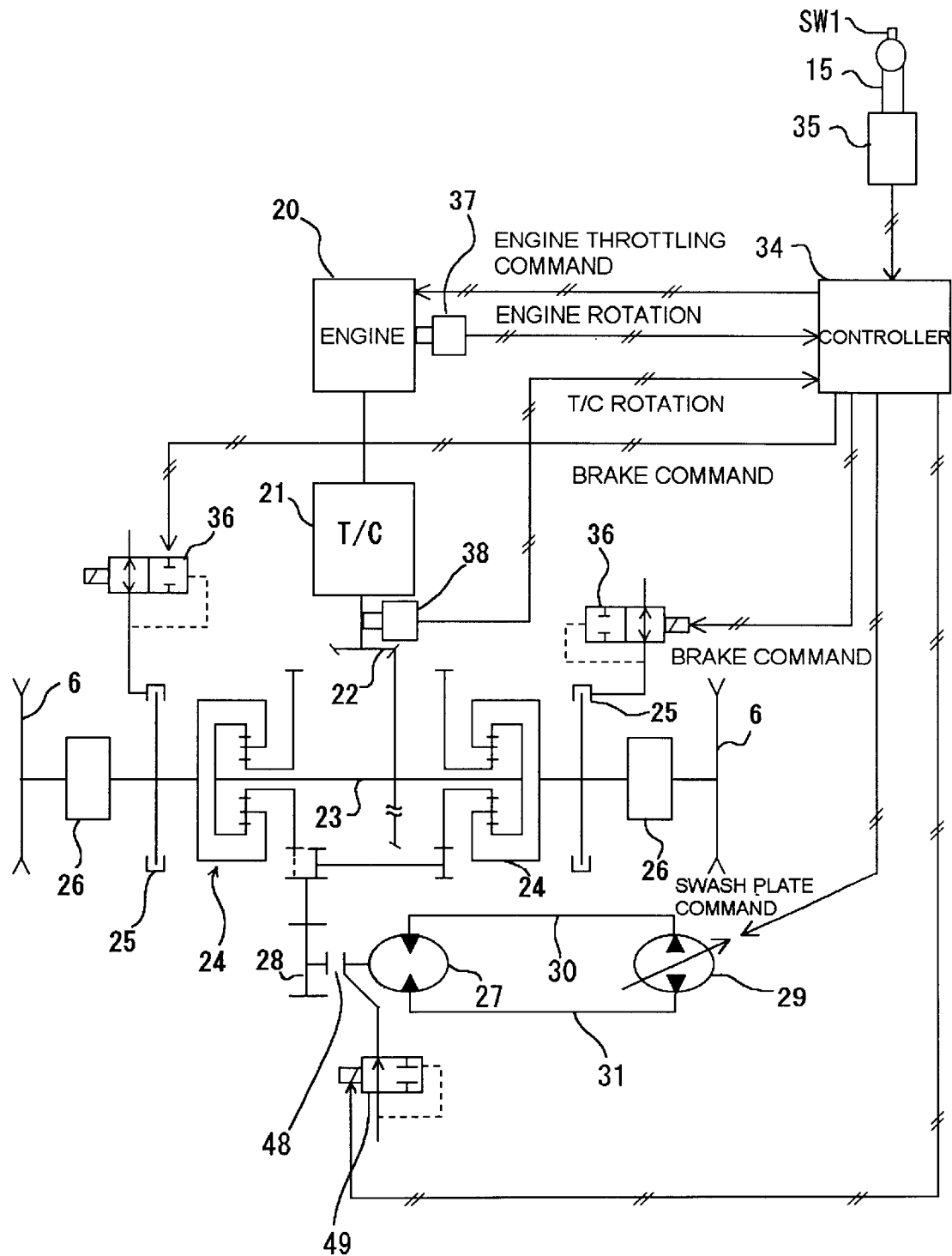
FIG. 13 is a control system configuration diagram according to a ninth embodiment.

FIG. 13 shows a control system diagram of a ninth embodiment of the Invention.

According to the ninth embodiment, an independent closed hydraulic circuit including the variable displacement type hydraulic pump 29 and the hydraulic motor 27 is provided with a motor clutch 48 between the output shaft of the hydraulic motor 27 and the pinion 28 and provided with a motor clutch solenoid 49 for controlling the motor clutch 48. Upon receipt of a command from the controller 34 during the pivot turn control, the motor clutch 48 is disengaged through the motor clutch solenoid 49. By use of such a motor clutch 48, the same effect as that of the foregoing embodiments can be achieved.

Tenth Embodiment

Figure 14:
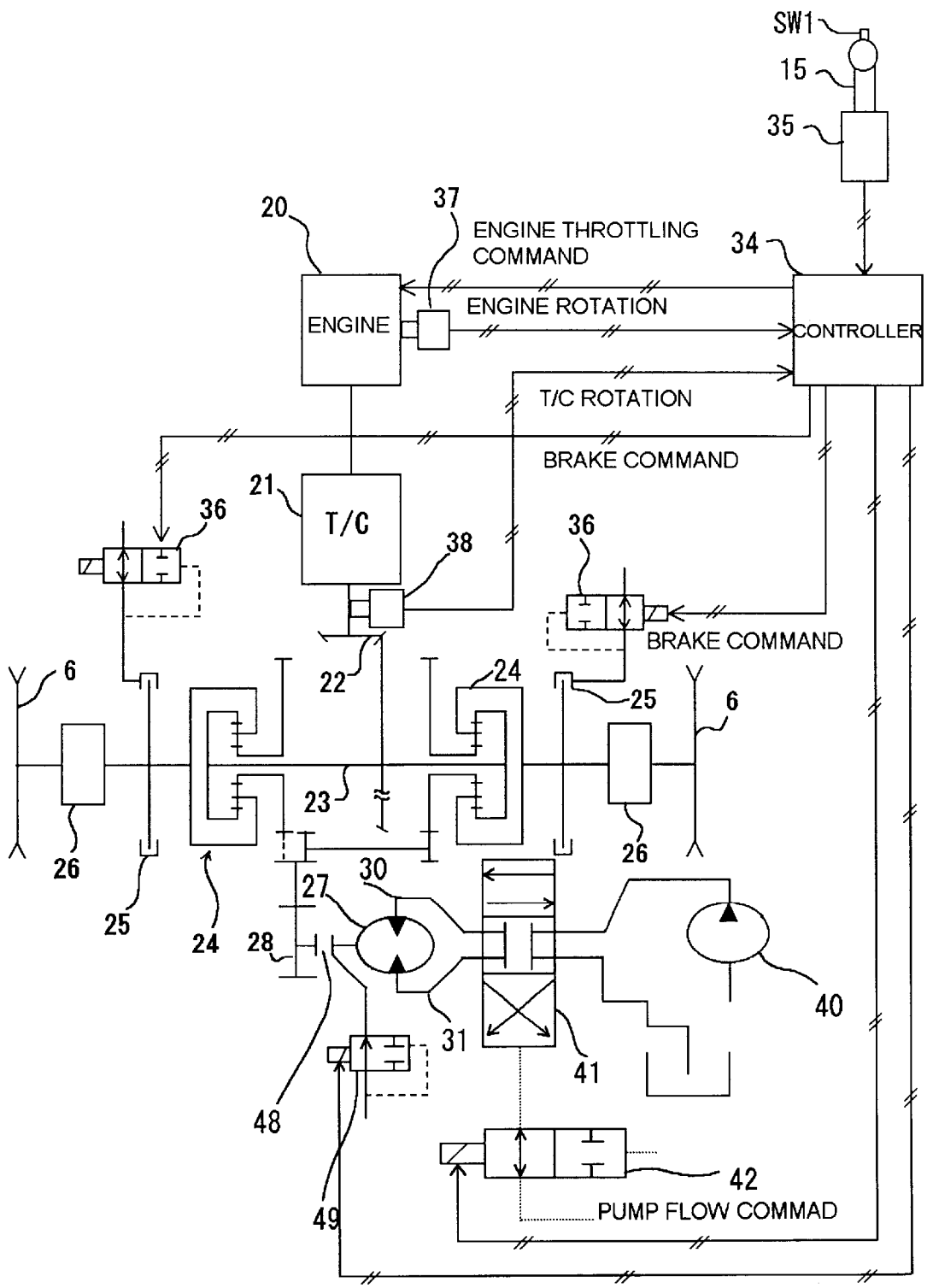
FIG. 14 is a control system configuration diagram according to a tenth embodiment of the invention.

FIG. 14 shows a control system diagram of a tenth embodiment of the Invention.

In the tenth embodiment, an open circuit comprised of the hydraulic pump 40 and the hydraulic motor 27 has the direction control valve 41 and the electromagnetic control valve 42 for controlling the operation of the direction control valve 41. This open circuit also includes the same motor clutch 48 and motor clutch solenoid 49 as those of the ninth embodiment 9.

Eleventh Embodiment

Figure 15:
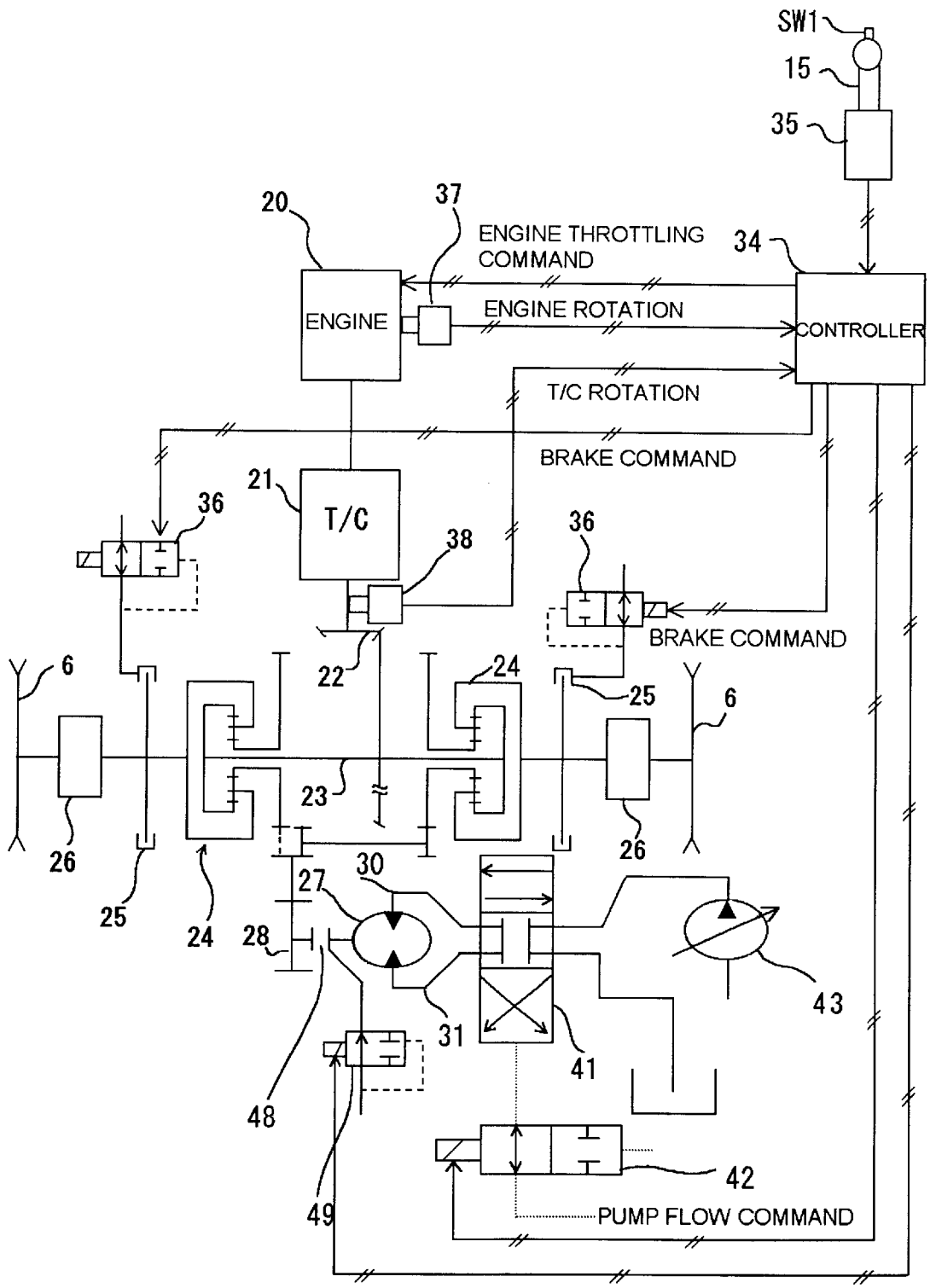
FIG. 15 is a control system configuration diagram according to an eleventh embodiment of the invention.

FIG. 15 shows a control system diagram of an eleventh embodiment of the Invention.

In the eleventh embodiment, the variable displacement type hydraulic pump 43 is used in place of the fixed displacement type hydraulic pump 40 of the tenth embodiment. Other parts are similar to those of the tenth embodiment.

In the foregoing embodiments, the engine rotational speed detector 37 detects the rotational speed of the engine during a pivot turn of the vehicle and the rotational speed of the engine is controlled so as to be no more than a specified value. An alternate arrangement may be made such that the rotational speed of the torque converter output shaft is detected by the torque converter output shaft rotational speed detector 38 and a throttling command is issued to the engine 20 so that the rotational speed of the torque converter output shaft becomes no more than a specified value. Also, it is possible to calculate the rotational speed of the hydraulic motor from vehicle speed and to issue a throttling command to the engine 20 such that the rotational speed of the motor becomes no more than a specified value.

While each embodiment has been described in the case of pivot turn control when the bulldozer travels on a flat land, the invention may be applied to cases where the vehicle travels on an inclined land. In the latter application, a tilt angle meter may be provided for detecting the tilt angle of the vehicle and if a tilt angle detected by the tilt angle meter is no less than a specified value, a specified rotational speed value for the engine, a specified rotational speed value for the torque converter output shaft or a specified rotational speed value for the hydraulic motor can be corrected. Likewise, the aforesaid specified values can be respectively corrected in accordance with the tractive force, speed range or the like of the vehicle.

Although each embodiment when applied to a bulldozer has been described, it is apparent that the invention is applicable to other types of tracklaying vehicles.

What is claimed is:

1. A steering method for a tracklaying vehicle provided with a pair of brakes for right and left output shafts and designed to allow the driving force of a hydraulic motor to be transmitted to each of the output shafts through differential steering means, wherein, during a pivot turn of a vehicle, an operation of the brake for either one of the output shafts and a transmission of the driving force from the hydraulic motor to the differential steering means are simultaneously carried out for a specified period of time and thereafter, the transmission of the driving force from the hydraulic motor to the differential steering means is interrupted.

2. A steering system for a tracklaying vehicle provided with a pair of brakes for right and left output shafts and designed to allow the driving force of a hydraulic motor to be transmitted to each of the output shafts through differential steering means, the steering system comprising:

(a) brake operating means for independently operating the right and left brakes;

(b) driving force transmission interrupting means for interrupting a transmission of the driving force from the hydraulic motor to the differential steering means;

(c) pivot turn control command signal detecting means for detecting an issue of a vehicle pivot turn control command signal; and (d) controlling means for controlling the brake operating means and the driving force transmission interrupting means, in response to an output from the pivot turn control command signal detecting means, such that after an operation of the brake for either one of the right and left output shafts by the brake operating means and a transmission of the driving force from the hydraulic motor to the differential steering means have been simultaneously carried out for a specified period of time, the transmission of the driving force from the hydraulic motor to the differential steering means is interrupted by the driving force transmission interrupting means.

3. A steering system for a tracklaying vehicle according to claim 2 which further comprises engine rotational speed detecting means for detecting the rotational speed of an engine and wherein the controlling means controls the engine in such a way that the rotational speed of the engine detected by the engine rotational speed detecting means during a pivot turn of the vehicle is no more than a specified rotational speed value.

4. A steering system for a tracklaying vehicle according to claim 2, wherein the controlling means executes desired control after an elapse of a specified time after receipt of an output from the pivot turn control command signal detecting means.

5. A steering system for a tracklaying vehicle according to any one of claims 2 to 4, wherein the pivot turn control command signal detecting means detects an issue of a vehicle pivot turn control command signal when a pivot turn control command switch provided in a turn operation lever has been depressed while the stroke of the turn operation lever is in a pivot turn region.

6. A steering system for a tracklaying vehicle according to claim 5, wherein the pivot turn region is in the vicinity of the lever stroke end of the turn operation lever and occupies no more than 20% of the entire lever stroke.

7. A steering system for a tracklaying vehicle according to any one of claims 2 to 4, wherein the pivot turn control command signal detecting means detects an issue of a vehicle pivot turn control command signal by detecting that the turn operation lever has reached the lever stroke end.

8. A steering system for a tracklaying vehicle according to claim 2, further comprising a mode selection switch for selecting whether or not the control by the controlling means is to be executed.

9. A steering system for a tracklaying vehicle according to claim 2, wherein the driving force transmission interrupting means shuts off the transmission of the driving force from the hydraulic motor to the differential steering means by opening a communication valve disposed in a communication path which communicates the upstream and downstream of the hydraulic motor with each other within a hydraulic drive closed circuit including a hydraulic pump and a hydraulic motor.

10. A steering system for a tracklaying vehicle according to claim 2, wherein the driving force transmission interrupting means is a motor clutch for shutting off the transmission of the driving force from the hydraulic motor to the differential steering means.

* * * * *